UNITED STATES PATENT OFFICE.

FRANÇOIS Z. ROUSSIN, OF PARIS, FRANCE, ASSIGNOR TO ALCIDE FRANÇOIS POIRRIER, OF SAME PLACE.

ARTIFICIAL COLORING-MATTER.

SPECIFICATION forming part of Letters Patent No. 225,908, dated March 23, 1880.

Application filed October 22, 1878.

*To all whom it may concern:*

Be it known that I, ZACHARIE ROUSSIN, of Paris, in the Republic of France, have invented a certain Improvement in Coloring-Matters and processes for producing the same, of which the following is a full, clear, and exact description.

The prime ingredient of these colors is the azo derivate of naphthionic acid, which is obtained in the following manner: A mixture of one part of naphthylamine and four to six parts of sulphuric acid at 66° Baumé is heated to about 140° centigrade. The product of this reaction is poured into water, and the naphthionic acid precipitated is, after sufficient washing, transformed into alkaline naphthionate.

To produce the azo derivative, pour into a liquid acidulated with sulphuric acid a solution of alkaline naphthionate to which has been added a nitrite, shaking them briskly. The azo derivative is deposited in the form of a crystalline powder of a straw-yellow, insoluble in water, ether, alcohol, &c. This azo derivative, by simply boiling in water, produces a red substance crystallizable in acetic acid. A coloring-matter is obtained with this azo derivative and sulphanilate of soda. With aniline, the two toluidines, or the salts of these amines, the azo derivative produces coloring-matters varying from orange to red. In fine, the azo derivative of naphthionic acid has a special action upon all the phenols, and produces with each of them a coloring-matter varying from yellow to red. With phenic acid there is obtained a yellow; with orcine, red; with resorcine, orange.

I have obtained all these products perfectly pure and well crystallized. Their preparation is simple and requires no special instruction, since it is effected by simple mixture (even cold) of the ingredients mentioned above, reacting, according to the case, in a neutral, an acid, or an alkaline medium.

Any chemist will understand that these colors consist of the sulpho-acids or sulpho-salts of oxy-diazo pairs of aromatic radicals, one of which radicals is the naphthyl derived from naphthionic acid; the other from the amine, amide, or phenol employed. Every chemist will also know that, in order to bring together the two aromatic radicals, the order of procedure may be varied. For instance, the amine may be first converted into a diazo compound, and it may then be treated with the phenol, and finally converted into sulpho acid or salt; or the phenol may be converted into a sulpho acid, and thus made to react upon the diazo compound of the amine.

I have described these methods as showing that the steps of the process by which the colors, in accordance with the invention, are produced may be varied in the order of procedure.

All these coloring-matters are absolutely new, and were first discovered by me.

I make no claim in this application to the special color obtained by the reaction of the diazoic derivative of naphthionic acid upon naphthol beta or naphthol alpha, as this, together with its method of manufacture, is made the subject-matter of a separate application for Letters Patent; nor do I claim in this application the product which may be obtained by substituting dioxy-naphthaline for either of the two isomeric naphthols in the process above described for the preparation of colors by the use of the diazo derivative of naphthionic acid.

Having thus described my said invention, what I claim, and desire to secure by Letters Patent, is—

1. The new artificial coloring-matters herein described, obtained by the action of the diazo derivative of naphthionic acid (amido-naphthyl sulphurous acid) upon the amines, the amides, and the phenols.

2. The process of making coloring-matters by causing the diazo derivative of naphthionic acid to react upon the amines, the amides, and the phenols, substantially as specified.

3. The new coloring-matters, consisting of the sulpho acids, or the salts of sulpho acids, of the diazo compounds of naphthyl combined with other aromatic radicals, such as contained in the amines, amides, and phenols.

In testimony whereof I have signed my name to this specification before two subscribing witnesses.

Z. ROUSSIN.

Witnesses:
   A. POIRRIER,
   J. ARMENGAUD.